United States Patent
Imamura et al.

(10) Patent No.: US 8,395,345 B2
(45) Date of Patent: Mar. 12, 2013

(54) VALVE CONTROL DEVICE

(75) Inventors: Naoki Imamura, Tokyo (JP); Masahiro Iezawa, Tokyo (JP); Satoshi Kawamura, Tokyo (JP); Yoshitaka Onishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/144,050

(22) PCT Filed: Jan. 12, 2010

(86) PCT No.: PCT/JP2010/050212
§ 371 (c)(1),
(2), (4) Date: Jul. 11, 2011

(87) PCT Pub. No.: WO2010/087224
PCT Pub. Date: Aug. 5, 2010

(65) Prior Publication Data
US 2011/0273127 A1    Nov. 10, 2011

(30) Foreign Application Priority Data

Jan. 28, 2009  (JP) ................... 2009-016828

(51) Int. Cl.
*G05F 1/10* (2006.01)
(52) U.S. Cl. ....................................... 318/650
(58) Field of Classification Search ............. 318/400.02, 318/650, 800, 807, 719
See application file for complete search history.

(56) References Cited

U.S. PATENT DOCUMENTS 7,463,006 B2 * 12/2008 Ta et al. ................. 318/807
8,115,429 B2 *  2/2012 Ueda et al. ............ 318/400.02

FOREIGN PATENT DOCUMENTS

| JP | 2 298644 | 12/1990 |
| JP | 2000 130229 | 5/2000 |
| JP | 2000 234564 | 8/2000 |
| JP | 2005 27386 | 1/2005 |

OTHER PUBLICATIONS

International Search Report issued Apr. 13, 2010 in PCT/JP10/050212 filed Jan. 12, 2010.
Morimoto, Shigeo, et al., "High-Performance Current-Sensorless Drive for PMSM and SynRM With Only Low-Resolution Position Sensor," IEEE Transactions on Industry Applications, vol. 39, No. 3, May/Jun. 2003, pp. 792-801.
Office Action mailed Nov. 19, 2012, in German Patent Application No. 11 2010 000 768.3, (w/English translation), pp. 1-10.

* cited by examiner

*Primary Examiner* — Walter Benson
*Assistant Examiner* — Zoheb Imtiaz
(74) *Attorney, Agent, or Firm* — Oblon, Spivak, McClelland, Maier & Neustadt, L.L.P.

(57) ABSTRACT

In opening/closing control for the valve mechanism to which the return torque is applied in an opening direction or a closing direction of the valve, provided are a position control system for outputting a q-axis current command based on a position deviation between a target position command directed to the brushless DC motor and the coarse present position of the motor obtained by using the position detection sensor of a pulse output type, and a current control system in which a virtual current feedback is built for outputting a phase voltage command without a current sensor based on the q-axis current command and the coarse present position of the motor obtained by using the position detection sensor of the pulse output type.

5 Claims, 15 Drawing Sheets

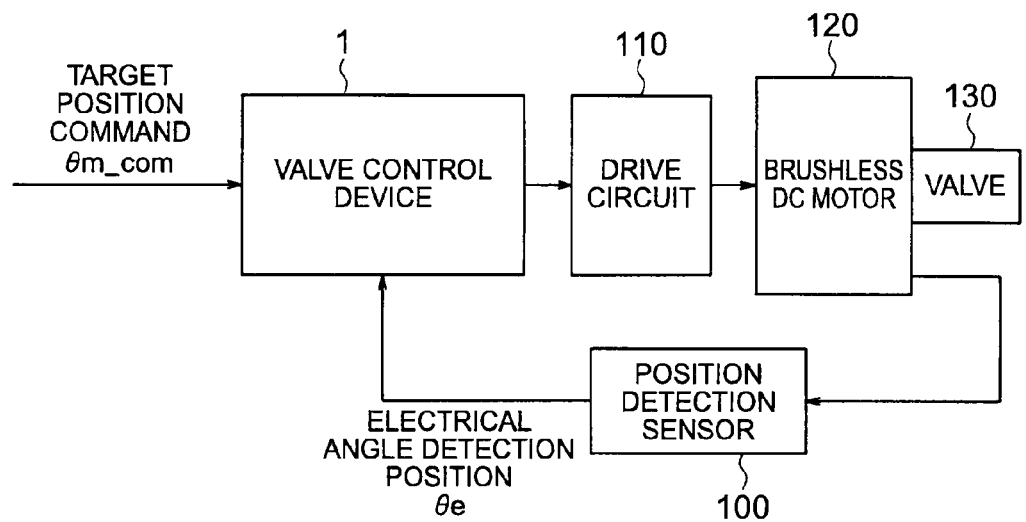
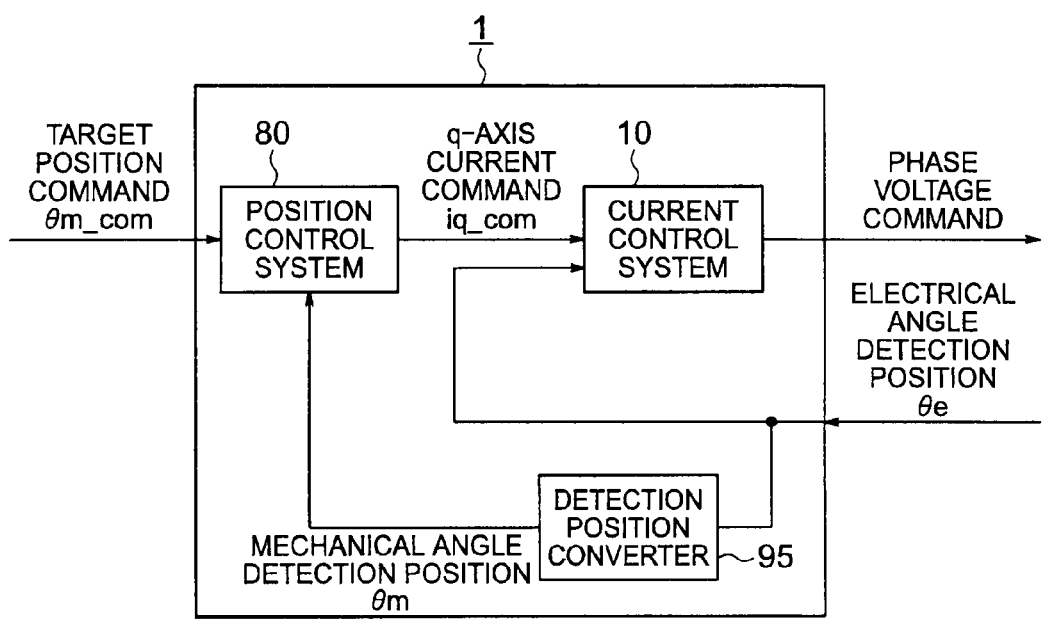

FIG. 7

| ELECTRICAL ANGULAR VELOCITY (deg/s) θe_dot | q-AXIS CURRENT COMMAND (A) iq_com | RANGE OF ELECTRICAL ANGLE DETECTION POSITION θe (deg) | U-PHASE CURRENT COMMAND (A) iu_com | V-PHASE CURRENT COMMAND (A) iv_com |
|---|---|---|---|---|
| θe_dot ≧ 0 | iq_com ≧ 0 | 0 ≦ θe < 60 | i_max/2 | −i_max |
| θe_dot < 0 | iq_com < 0 |  | −i_max/2 | i_max |
| θe_dot ≧ 0 | iq_com ≧ 0 | 60 ≦ θe < 120 | i_max | −i_max/2 |
| θe_dot < 0 | iq_com < 0 |  | −i_max | i_max/2 |
| θe_dot ≧ 0 | iq_com ≧ 0 | 120 ≦ θe < 180 | i_max/2 | i_max/2 |
| θe_dot < 0 | iq_com < 0 |  | −i_max/2 | −i_max/2 |
| θe_dot ≧ 0 | iq_com ≧ 0 | 180 ≦ θe < 240 | −i_max/2 | i_max |
| θe_dot < 0 | iq_com < 0 |  | i_max/2 | −i_max |
| θe_dot ≧ 0 | iq_com ≧ 0 | 240 ≦ θe < 300 | −i_max | i_max/2 |
| θe_dot < 0 | iq_com < 0 |  | i_max | −i_max/2 |
| θe_dot ≧ 0 | iq_com ≧ 0 | 300 ≦ θe < 360 | −i_max/2 | −i_max/2 |
| θe_dot < 0 | iq_com < 0 |  | i_max/2 | i_max/2 |

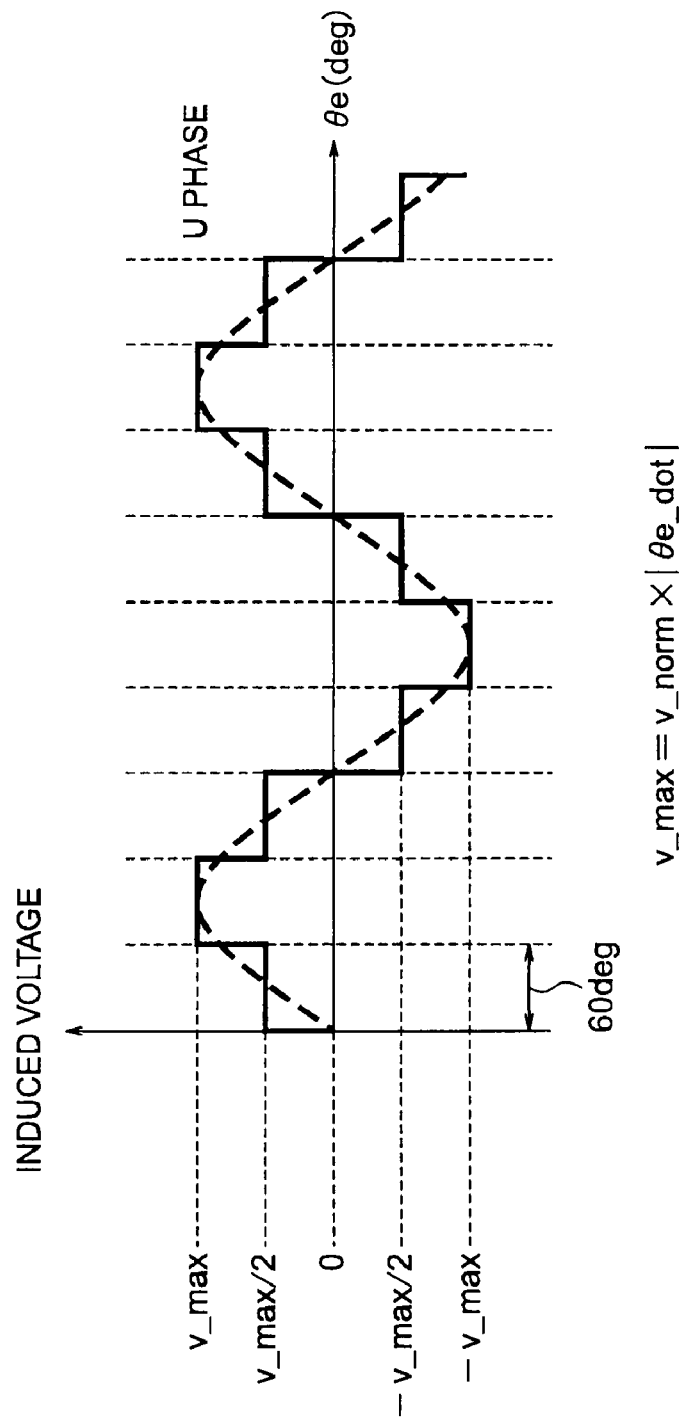

FIG. 10

| ELECTRICAL ANGULAR VELOCITY(deg/s) $\theta e\_dot$ | RANGE OF ELECTRICAL ANGLE DETECTION POSITION $\theta e$ (deg) | ESTIMATED U-PHASE INDUCED VOLTAGE (V) eu_est | ESTIMATED V-PHASE INDUCED VOLTAGE (V) ev_est |
|---|---|---|---|
| $\theta e\_dot \geqq 0$ | $0 \leqq \theta e < 60$ | v_max/2 | −v_max |
| $\theta e\_dot < 0$ | | −v_max/2 | v_max |
| $\theta e\_dot \geqq 0$ | $60 \leqq \theta e < 120$ | v_max | −v_max/2 |
| $\theta e\_dot < 0$ | | −v_max | v_max/2 |
| $\theta e\_dot \geqq 0$ | $120 \leqq \theta e < 180$ | v_max/2 | v_max/2 |
| $\theta e\_dot < 0$ | | −v_max/2 | −v_max/2 |
| $\theta e\_dot \geqq 0$ | $180 \leqq \theta e < 240$ | −v_max/2 | v_max |
| $\theta e\_dot < 0$ | | v_max/2 | −v_max |
| $\theta e\_dot \geqq 0$ | $240 \leqq \theta e < 300$ | −v_max | v_max/2 |
| $\theta e\_dot < 0$ | | v_max | −v_max/2 |
| $\theta e\_dot \geqq 0$ | $300 \leqq \theta e < 360$ | −v_max/2 | −v_max/2 |
| $\theta e\_dot < 0$ | | v_max/2 | v_max/2 |

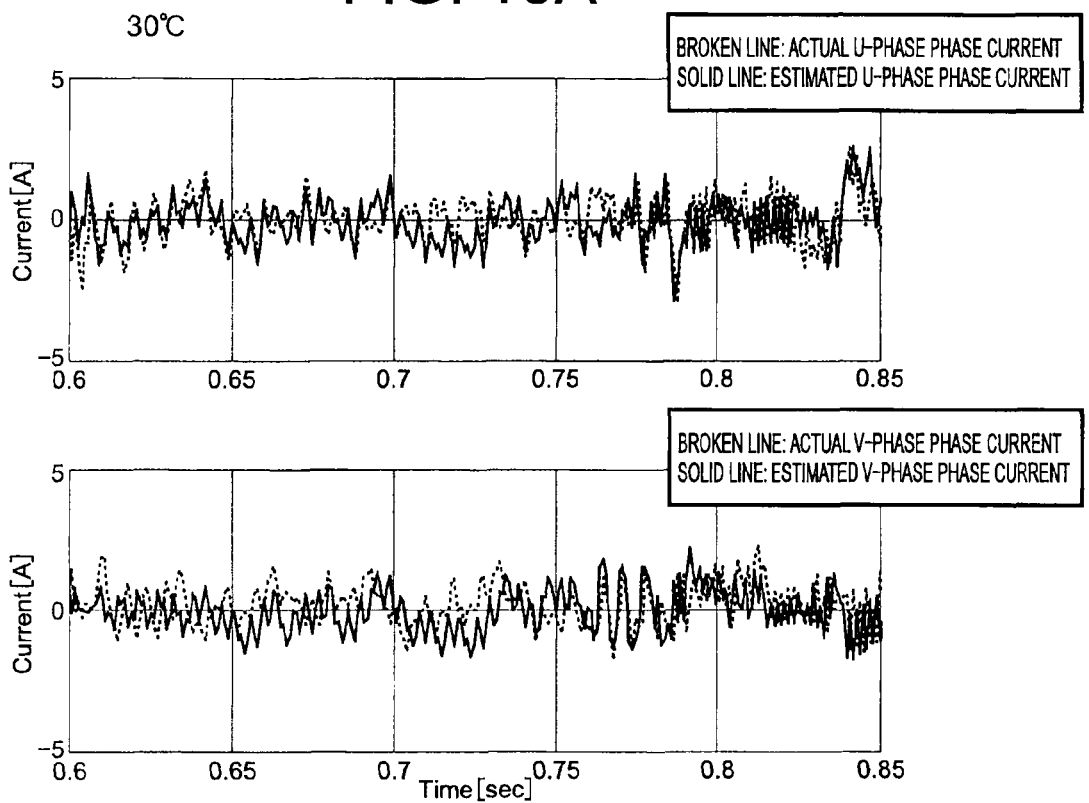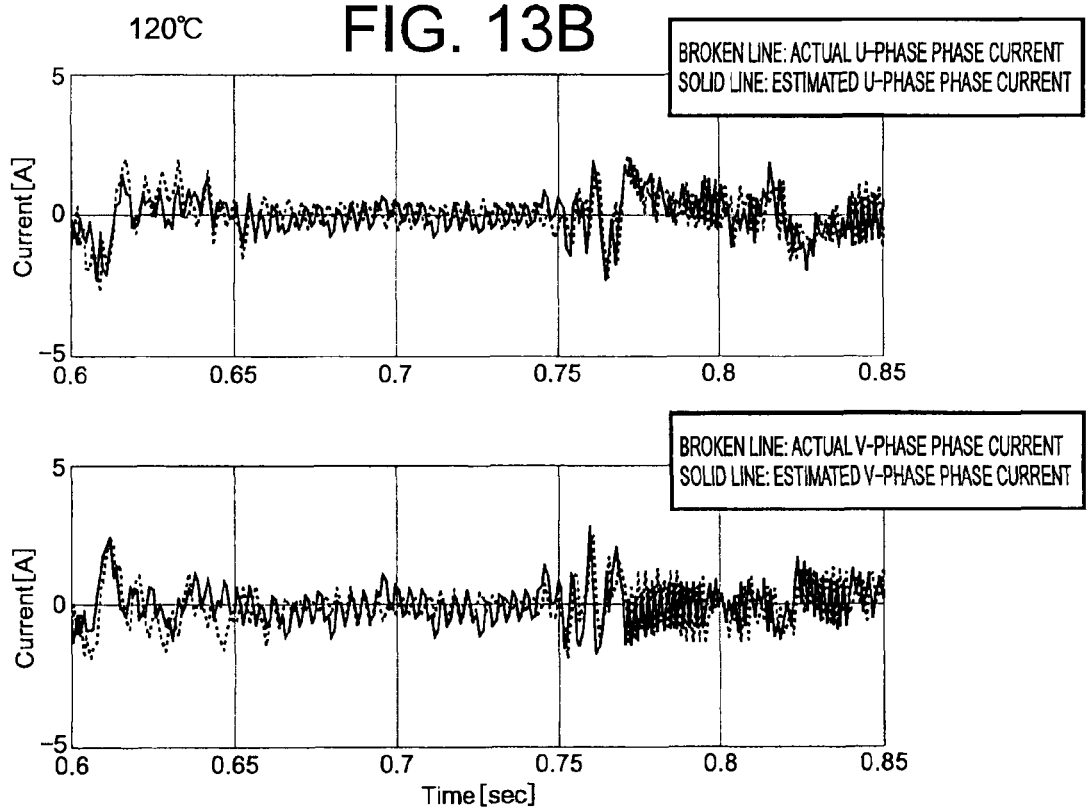

VALVE CONTROL DEVICE

TECHNICAL FIELD

The present invention relates to a valve control device for a valve that is used, for example, for electronic throttling and exhaust gas recirculation, and is driven by a brushless DC motor.

BACKGROUND ART

For speed control and position control for a system driven by a motor, there are a "voltage control method" of generating a voltage command directed to the motor based on a deviation between a command and an actual value, and a "current control method" of feeding back an actual current flowing through a winding of the motor so as to control the actual current to coincide with a current command.

The latter current control method applies the control forcedly overcoming the inductance component of the motor windings, and a current lag due to the inductance component in a control bandwidth of a current control system can thus be neglected, thereby providing stable torque control from a low speed range to a high speed range of the motor. On the other hand, in the voltage control method, the influence of the current lag due to the inductance component of the motor windings with respect to the voltage command cannot be neglected and the torque tracking characteristic is deteriorated compared to the current control method, resulting in a defect of presenting an oscillatory response.

By the way, as prior art, there is a technology, in which when an output DUTY is set in accordance with a required DUTY based on a required current for a torque motor for controlling an operation state in an actuator control device for an internal combustion engine, in order to avoid a case in which the output DUTY corresponding to the required DUTY cannot be set due to a restriction on a circuit and the like, the required DUTY and the output DUTY are made coincident with each other by converting the output DUTY into an output current in accordance with a power supply voltage and a resistance in a current path, further estimating a counter electromotive force using an estimated current smoothed in accordance with the coil inductance component of the torque motor, and adding the counter electromotive force to the required DUTY (refer to Patent Literature 1, for example).

Moreover, for a valve of a torque balance drive type which opens/closes the valve in a torque balance between a return spring by energizing means and a motor torque of a DC motor, there is a technology in which the DC motor is controlled by a combination of a feedforward control system and feedback control, and operation amounts of the feedforward control system and the feedback control are further corrected in accordance with a steady state deviation in position (refer to Patent Literature 2, for example).

According to the invention described in Patent Literature 1, it is expected that the lag of the actuator be eliminated, resulting in an increase in stability of the tracking characteristic.

Moreover, according to the invention described in Patent Literature 2, it is expected that the feedforward control system always apply the drive voltage for generating a motor torque corresponding to the return torque in accordance with the opening/closing directions of the valve, and the feedback control system (PID control described in Patent Literature 2) act so as to compensate the position deviation amount thus generated between the present position and the target position, and vibration be thus prevented from occurring by reducing the feedback control amount independently of the opening/closing directions of the valve.

Further, according to the invention described in Patent Literature 2, it is expected that optimal control be provided in accordance with operation characteristics of the valve, which are changed by factors such as the environmental temperature, by correcting a drive duty calculated in accordance with the position deviation by the feedforward control system and a coefficient in an arithmetic operation unit of the feedback control system.

CITATION LIST

Patent Literature
Patent Literature 1: JP 2000-130229 A
Patent Literature 2: JP 2000-234564 A

SUMMARY OF INVENTION

Technical Problems

However, in the actuator control device described in Patent Literature 1, there is a problem in that as the response is accelerated, influence of the sampling period in control calculation becomes significant, resulting in a lag in the present detection position, and the currents in the windings of the torque motor cannot thus be precisely estimated, resulting in an oscillatory response at the high speed drive. Moreover, if the resolution of a throttle opening sensor is coarse, angular information required for processing of calculating a counter electromotive voltage becomes oscillatory, and the counter electromotive voltage cannot thus be precisely estimated, with the result that the required DUTY and the output DUTY do not coincide with each other. Further, the actuator described in Patent Literature 1 is a brushed DC motor, and hence there arises a problem of a maintainability of brushes.

Moreover, the valve control device described in Patent Literature 2 employs the voltage control method of generating the drive duty for the motor in accordance with the deviation between the target value and the present value by means of the PID control. If the valve is controlled by this method in a direction in which the return torque acts, as the motor rotation speed increases, the response of a position control system cannot track a change in the motor torque due to an acceleration effect of the return torque. As a result, there is a problem in that if the direction in which the return torque acts is the valve closing direction, for example, the response of the valve becomes oscillatory or the valve collides with a mechanical end during the valve closing operation due to a lag in tracking the torque.

The present invention has been made to solve the foregoing problems, and it is an object of the present invention to provide a valve control device in which an actuator is a brushless DC motor, and a sensor of a pulse output type is provided to the brushless DC motor, the valve control device including a current control system which calculates phase current commands and induced voltages based on a sensor output having a coarse electrical angle resolution and further suppresses influence of the sampling period by carrying out a phase correction for a position to be used for current control, to provide a virtual current feedback which allows phase currents to be accurately estimated. The control system directly controls the motor torque and hence a current corresponding to the torque contributing to the torque is effectively generated to increase the valve response speed, and enable a soft landing without collision of the valve with a mechanical end.

Solution to Problems

The present invention provides a valve control device for a valve mechanism to which a return torque is applied in an opening direction or a closing direction of a valve, the valve control device controlling opening and closing of the valve in a balance between the return torque and a motor torque provided by control of a motor for applying a torque in a direction opposite to a direction of the return torque,
the valve control device includes: a detection position converter for converting an electrical angle detection position, which is a present position of the motor detected by a position detection sensor, into a mechanical angle detection position; a position control system for outputting a q-axis current command based on a deviation between a target position command and the mechanical angle detection position of the motor; and a current control system for distributing the q-axis current command to a phase current command of each of phases of the motor based on the electrical angle detection position, generating a phase voltage command of the each of the phases based on a current deviation between the phase current command and a fed-back estimated current of the each of the phases, obtaining an estimated induced voltage of the each of the phases based on the electrical angle detection position and an induced voltage actually measured in advance, obtaining an estimated current of the each of the phases based on the estimated induced voltage and the phase voltage command, and outputting a phase voltage command to which saturation processing is finally applied in an actually-used voltage range.

Advantageous Effects of Invention

According to the valve control device according to the present invention, the current control system can be configured to have the virtual current feedback using a sensor having a coarse electrical angle resolution. Then, the torque is directly controlled by the current control system, and the response of the motor can thus be accelerated. Moreover, wide-band torque control by this current control system can be used to effectively generate a motor torque opposing to a return toque particularly at a low speed motor rotation, thereby decreasing the speed by the motor torque even if the return torque is generated in the accelerating direction, resulting in prevention of a collision of the valve to the mechanical end. Further, the configuration does not require a current sensor, and the cost of the control system can thus be reduced.

BRIEF DESCRIPTION OF DRAWINGS

FIG. 1 is a block diagram illustrating an overall configuration of a control system including a valve control device according to a first embodiment of the present invention.

FIG. 2 is a block diagram illustrating a configuration of the valve control device according to the first embodiment of the present invention.

FIG. 7 illustrates a specific waveform shaping method for performing waveform shaping of a sinusoidal-wave phase current command into a square-wave phase current command for the valve control device according to the first embodiment of the present invention.

FIG. 8 illustrates how a square-wave induced voltage is generated based on a fundamental harmonic of an induced voltage of the valve control device according to the first embodiment of the present invention.

FIG. 10 illustrates a specific waveform shaping method for estimating an induced voltage for each of phases by the valve control device according to the first embodiment of the present invention.

FIGS. 13A-13B illustrate results of simulation for behaviors of estimated phase currents and actual phase currents respectively at the environmental temperatures of 30° C. and 120° C. during the valve closing control of the valve control device according to the first embodiment of the present invention.

DESCRIPTION OF EMBODIMENTS

Figure 3:
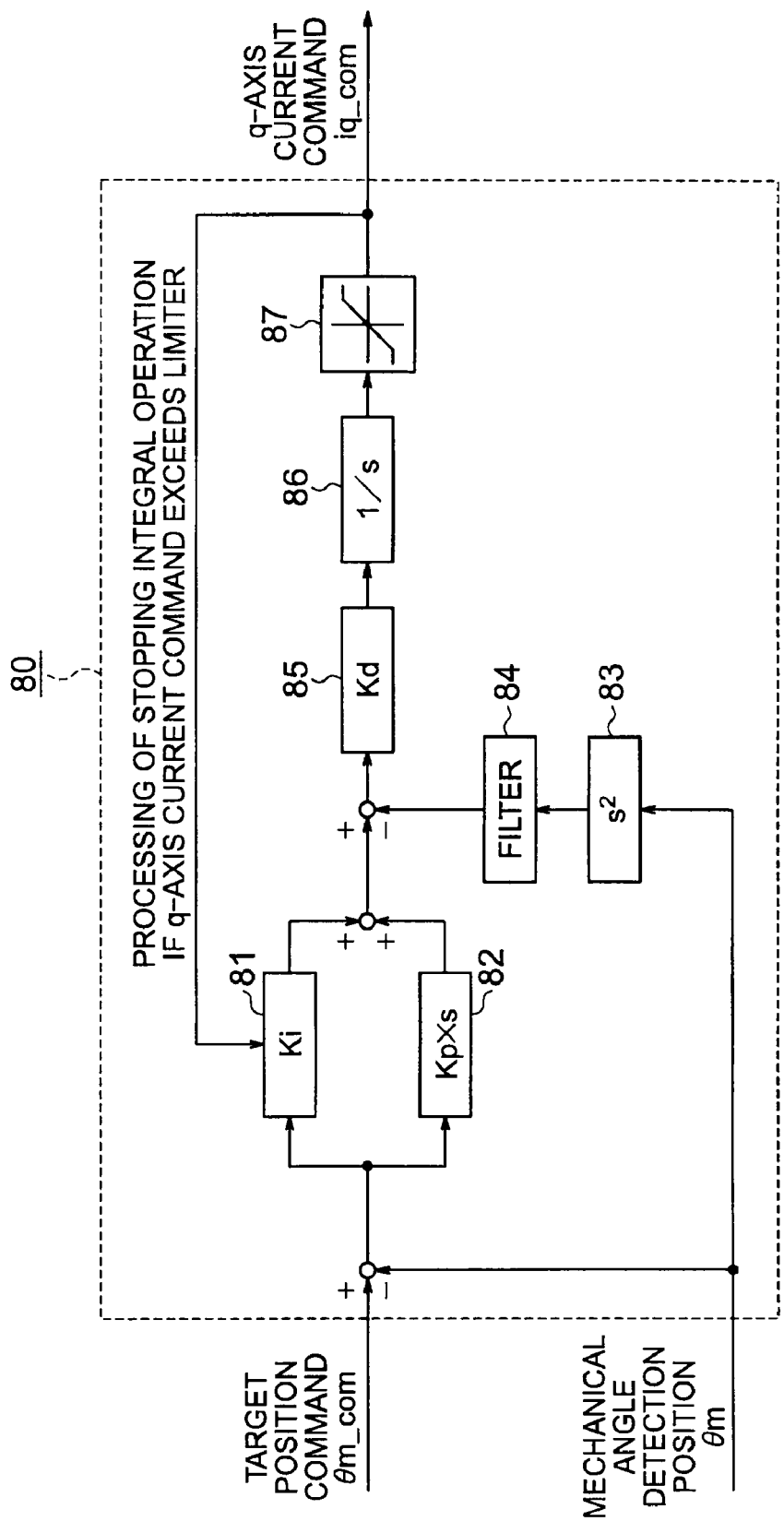
FIG. 3 is a block diagram illustrating a configuration of a position control system of the valve control device as a transfer function of a continuous system according to the first embodiment of the present invention.

A description is given of preferred embodiments of a valve control device according to the present invention referring to drawings.

[First Embodiment]

A description is given of the valve control device according to a first embodiment of the present invention referring to FIGS. 1 to 14. FIG. 1 is a block diagram illustrating an overall configuration of a control system including the valve control device according to the first embodiment of the present invention. It should be noted that like numerals denote like or corresponding components throughout the drawings hereinafter.

In FIG. 1, the control system includes a valve control device 1, a position detection sensor 100, a drive circuit 110, a brushless DC motor 120, and a valve 130.

In FIG. 1, an actuator for driving the valve 130 is the brushless DC motor 120. Moreover, the position detection sensor 100 of the pulse output type such as a Hall IC is provided to the brushless DC motor 120. The resolution of the position detection sensor 100 corresponds to six steps per period of the electrical angle, namely the electrical angle resolution is 60 deg.

A spring (not show) is coupled as energizing means to the valve 130, and a preload is applied to the spring in advance so that a return torque by the spring acts in a valve closing direction, for example. On the other hand, the brushless DC motor 120 is coupled to a spring via a power transmission mechanism (not shown), which is operationally associated with a motor rotation shaft, and the valve thus reaches a state in which the valve is pressed against a mechanical end by a torque (return torque) caused by the preload when the valve is in a valve closing operation.

The valve control device 1 provides the drive circuit 110 with a phase voltage command based on a target position command θm_com directed to the valve 130 and an electrical angle detection position θe (present position) obtained from the position detection sensor 100. Power elements (not shown) are then switched based on the phase voltage command, which is the output of the valve control device 1, in the drive circuit 110.

FIG. 2 is a block diagram illustrating a configuration of the valve control device according to the first embodiment of the present invention.

In FIG. 2, the valve control device 1 is a valve control device 1 for the valve mechanism to which the return torque is applied in the closing direction of the valve 130, the valve control device 1 controlling opening/closing of the valve in a balance between the return torque and a motor torque provided by control of the brushless DC motor 120 for applying the torque in a direction opposite to the return torque. The valve control device 1 includes a position control system 80, a current control system 10, and a detection position converter 95.

FIG. 3 is a block diagram illustrating a configuration of the position control system of the valve control device as a transfer function of a continuous system according to the first embodiment of the present invention.

In FIG. 3, the position control system 80 includees Ki 81, Kp×s 82, $s^2$ 83, a filter 84, kd 85, (1/s) 86, and a saturation processor 87.

Figure 4:
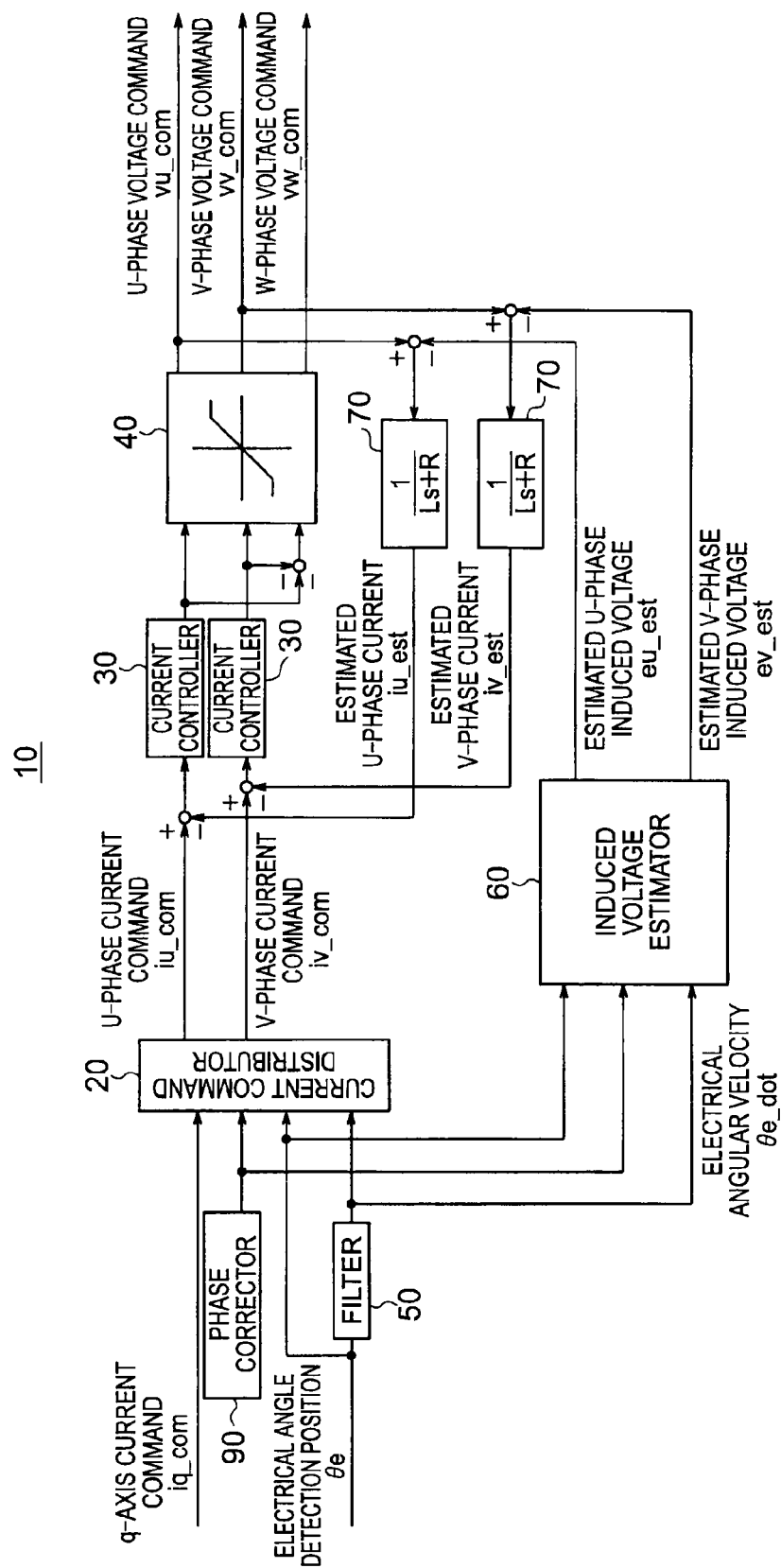
FIG. 4 is a block diagram illustrating a configuration of a current control system of the valve control device according to the first embodiment of the present invention.

FIG. 4 is a block diagram illustrating a configuration of the current control system of the valve control device according to the first embodiment of the present invention.

In FIG. 4, the current control system 10 includes a current command distributor 20, two current controllers 30, a saturation processor 40, a filter 50, an induced voltage estimator 60, two current estimators 70, and a phase corrector 90.

A description is now given of an operation of the valve control device according to the first embodiment referring to the drawings.

As illustrated in FIGS. 1, 2, and 3, the position control system 80 generates a q-axis current command iq_com based on the target position (target opening) command θm_com directed to the valve 130 from a computer upstream of the valve control device 1, and a mechanical angle detection position θm obtained by converting, by the detection position converter 95, an electrical angle detection position θe detected by the position detection sensor 100 provided to the brushless DC motor 120. The detection position converter 95 carries out conversion processing from the electrical angle into the mechanical angle. Specifically, if the number of motor pole pairs is p, the mechanical angle detection position θm is obtained by a conversion θe/p.

On this occasion, a specific configuration of the position control system 80 for generating the q-axis current command iq_com is the PI-D control of the speed-type algorithm as illustrated in FIG. 3, for example. It should be noted that the configuration of the position control system 80 may be different configuration such as the I-PD control other than the PI-D control. In this way, the q-axis current command iq_com is obtained by obtaining a difference between a value obtained by applying PI operations (81, 82) to a deviation between the mechanical angle detection position θm and the target position command θm_com, and a value obtained by applying differentiation (83) to the mechanical angle detection position θm and then applying filtering (84) for smoothing to the derivative, and by multiplying (85) the difference by a velocity gain Kd.

It should be noted that an output limit is applied by the saturation processor 87 to the q-axis current command iq_com, and anti-windup processing of stopping the integral operation (81) by the action of the integration gain Ki is further applied to the q-axis current command iq_com, if the q-axis current command iq_com exceeds an output limit. An overshoot in a position response caused by a windup of a manipulated variable by the integral operation is suppressed in this way.

Referring to FIG. 4, a description is now given of an operation of the current control system 10 for outputting the phase voltage command to the drive circuit 110 based on the q-axis current command iq_com, which is the output from the position control system 80, and the electrical angle detection position θe obtained from the position detection sensor 100.

As described above, the current control system 10 includes the current command distributor 20, the current controllers 30, the saturation processor 40, the filter 50, the induced voltage estimator 60, the current estimators 70, and the phase corrector 90.

The current command distributor 20 first carries out processing for distributing the q-axis current command iq_com to a U-phase current command iu_com and a V-phase current command iv_com. However, the electrical angle resolution is as coarse as 60 deg, and hence calculations involving trigonometric functions common to the current control for the three-phase motor are not employed in this command distribution processing considering a reduction of a load imposed by the calculation.

Figure 5:
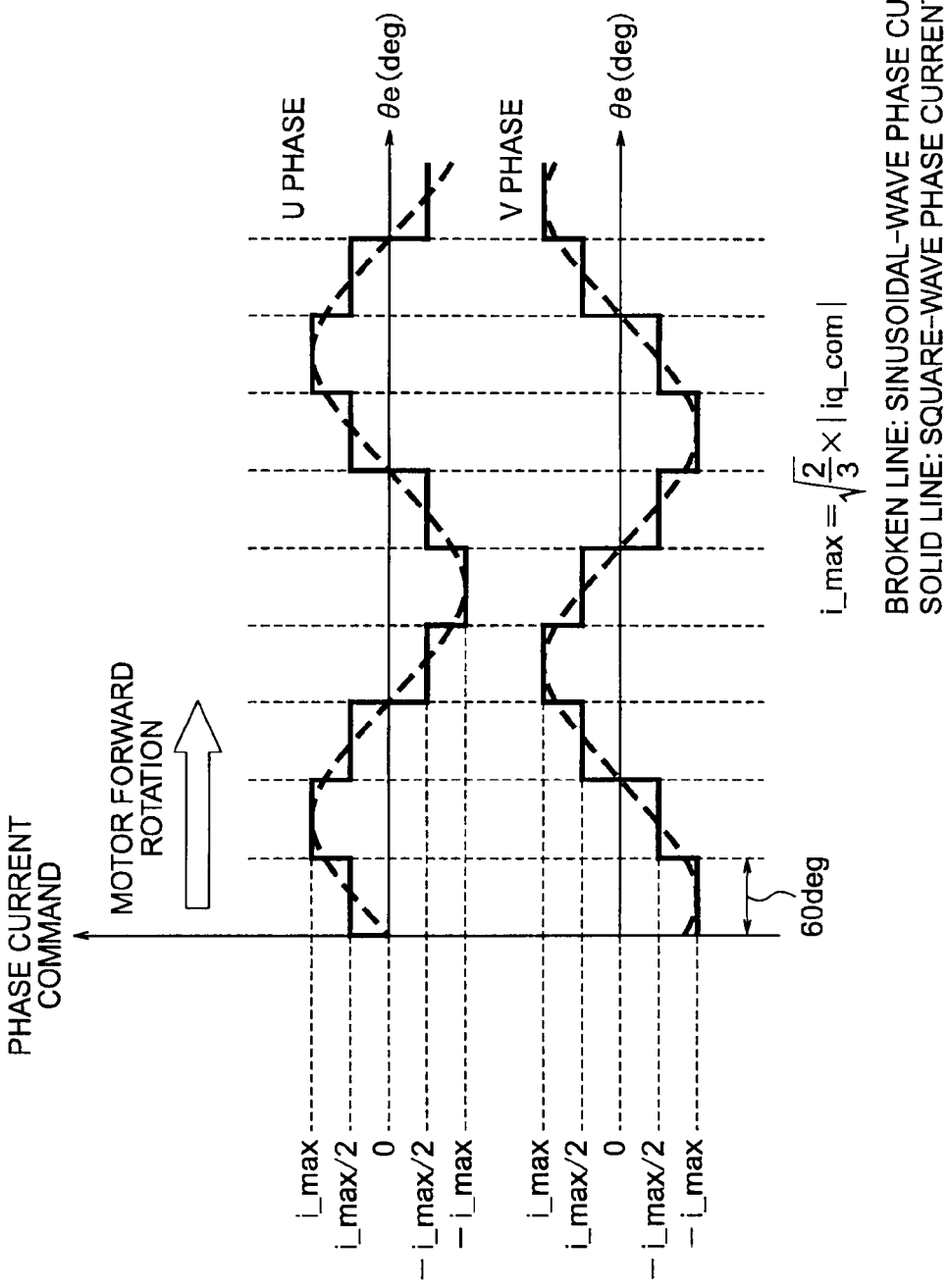
FIG. 5 illustrates a U-phase current command and a V-phase current command for the forward rotation of a motor for the valve control device according to the first embodiment of the present invention.
Figure 6:
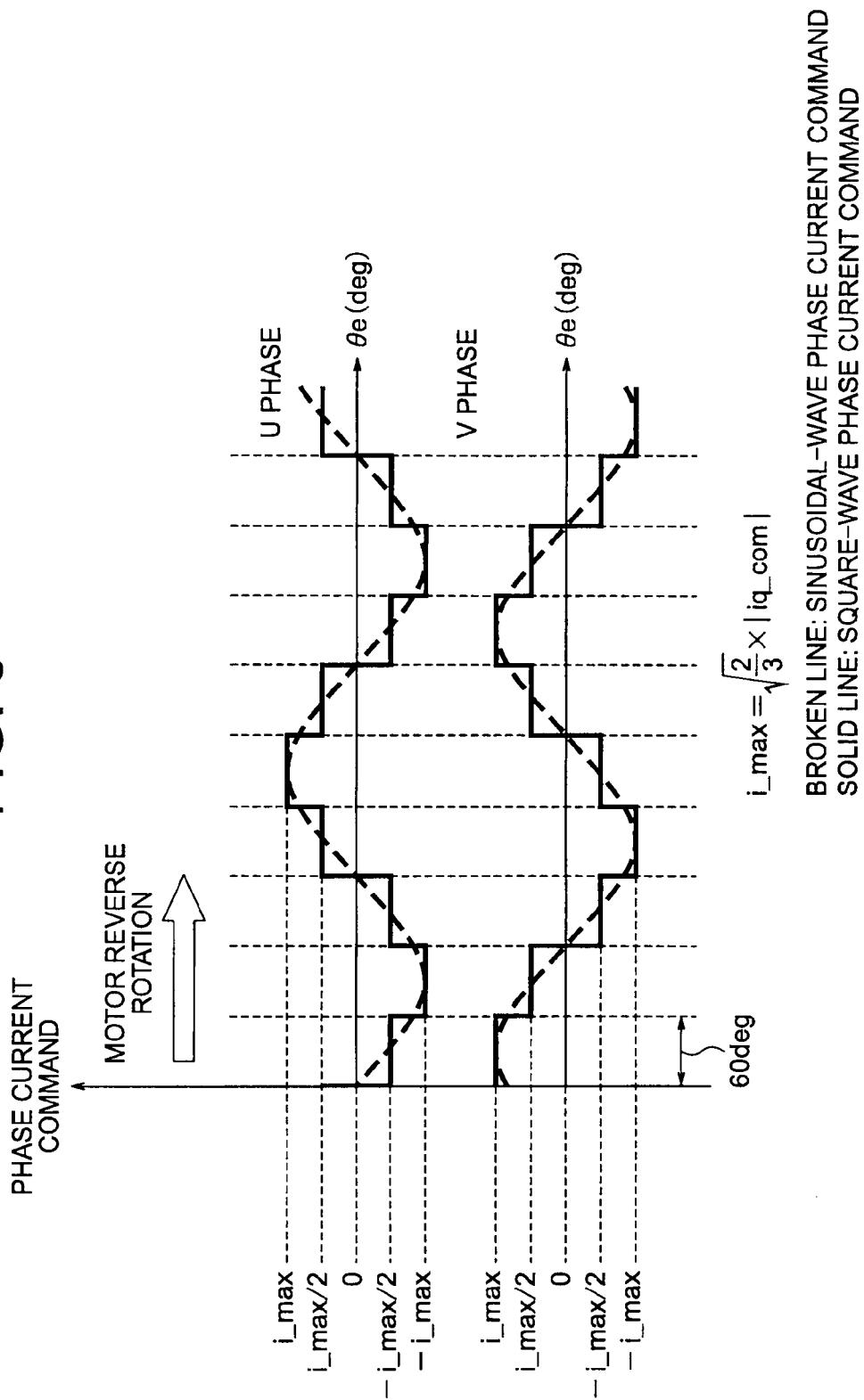
FIG. 6 illustrates the U-phase current command and the V-phase current command for the reverse rotation of the motor for the valve control device according to the first embodiment of the present invention.

In this embodiment, as illustrated in FIGS. 5 and 6, processing for approximating the U-phase current command and the V-phase current command, which are ideally obtained as sinusoidal waves by the calculation processing using the trigonometric functions, to square waves for each of the detection intervals of the electrical angle detection position θe is carried out. FIG. 5 illustrates the U-phase current command and the V-phase current command for the forward rotation of the motor, and FIG. 6 illustrates the U-phase current command and the V-phase current command for the reverse rotation of the motor. It should be noted that in FIGS. 5 and 6, solid lines represent the square-wave phase current commands approximated to square waves, and broken lines represent the ideal sinusoidal-wave phase current commands obtained by the calculation using the trigonometric functions, respectively.

A specific waveform shaping method for performing waveform shaping of the sinusoidal-wave phase current command into the square-wave phase current command is summarized as illustrated in FIG. 7 referring to FIGS. 5 and 6. The rotation direction of the motor can be determined based on the sign of the q-axis current command iq_com, the sign of an electrical angular velocity θe_dot obtained by applying a calculation to the electrical angle detection position θe by the filter 50 included in the current control system 10, or both the signs of the q-axis current command iq_com and the electrical angular velocity θe_dot. Moreover, a half amplitude i_max of the phase current command is calculated based on the following equation (1).

[Eq. 1]

$$i\_max = \sqrt{\frac{2}{3}} \times |iq\_com| \quad (1)$$

The method of the waveform shaping from the sinusoidal-wave phase current command into the square-wave phase current command has been described above. In this way, even if the electrical angle resolution of the position detection sensor 100 is as low as 60 deg, the phase current commands can be generated by the waveform shaping into the square waves, without employing the trigonometric functions, in each of the detection intervals of the electrical angle (the detection interval corresponds to the electrical angle resolution) in the current control system 10 configured to track a change in torque.

A description is now given of the current controllers 30. The current controllers 30 generate a U-phase voltage command and a V-phase voltage command respectively from iu_com−iu_est, iv_com−iv_est, which are current deviations respectively obtained by difference operation between the U-phase current command iu_com and the V-phase current command iv_com, which are outputs from the current command distributor 20, and an estimated U-phase current iu_est and an estimated V-phase current iv_est, which are described later. The current controllers 30 are configured only by proportional gains so that the controller outputs are respectively proportional to the current deviations, which correspond to a well-known technology, for example.

Moreover, the saturation processor 40 serves to suppress the half amplitudes of the U-phase voltage command, the V-phase voltage command, and the W-phase voltage command based on voltage levels on the drive circuit 110 side. It should be noted that a W-phase voltage command vw_b is calculated based on the following equation (2) where vu_b and vv_b respectively denote the U-phase voltage command and the V-phase voltage command, which are obtained as the outputs of the current controllers 30.

[Eq. 2]

$$vw\_b = -vu\_b - vv\_b \quad (2)$$

Figure 9:
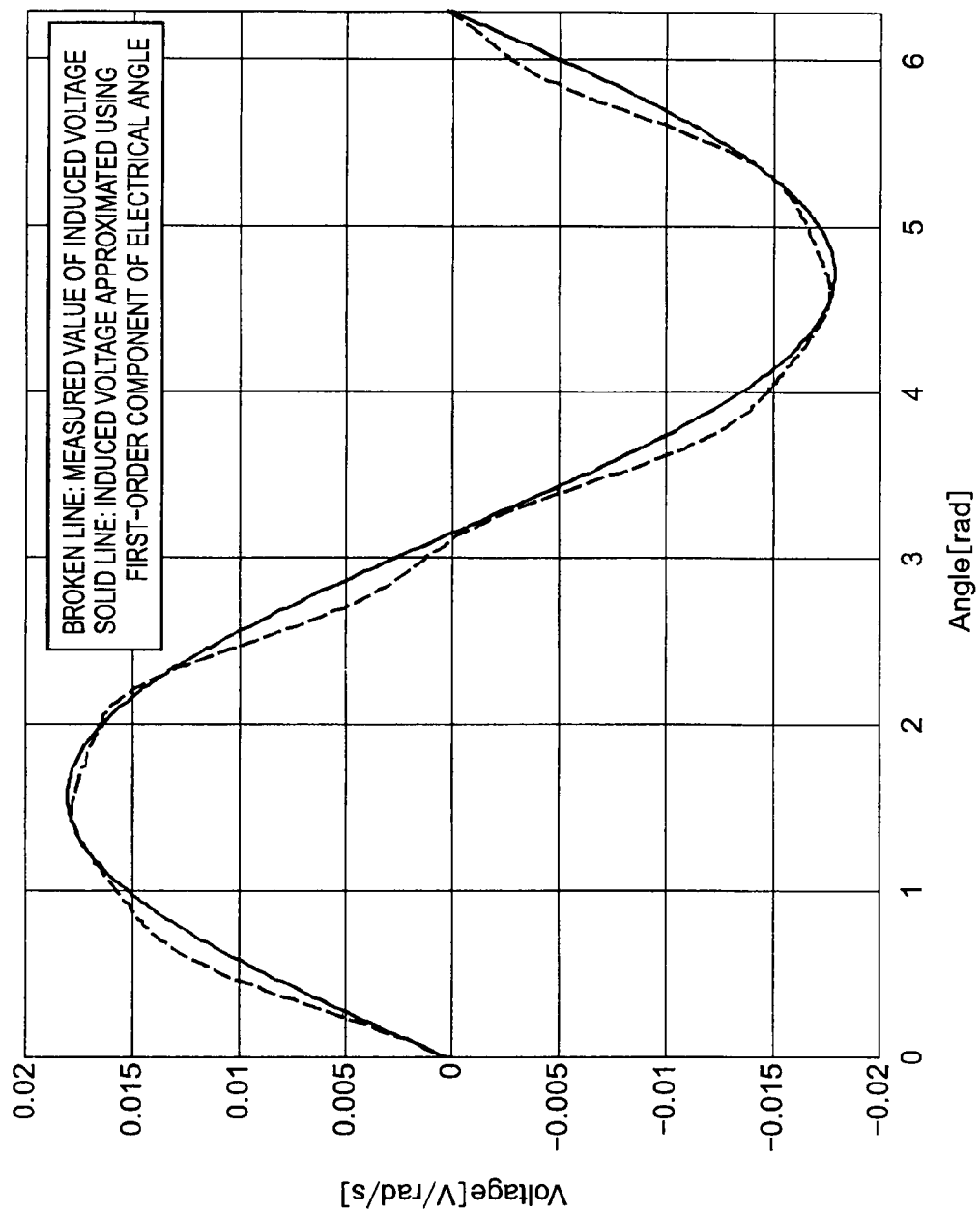
FIG. 9 illustrates how a normalized induced voltage of the valve control device is approximated based on the fundamental harmonic according to the first embodiment of the present invention.

A description is now given of the induced voltage estimator 60 referring to FIGS. 8 to 10. The induced voltage estimator 60 calculates an estimated U-phase induced voltage eu_est and an estimated V-phase induced voltage ev_est using the electrical angle detection position θe, the electrical angular velocity θe_dot, and measured values of the induced voltages of the brushless DC motor 120.

The electrical angular velocity θe_dot is obtained as an output from the filter 50 differentiating the electrical angle detection position θe detected for each electrical angle resolution and further smoothing the derivative, and the electrical angular velocity θe_dot presenting a small oscillation can be obtained due to the effect of the filter 50.

The measured value of the induced voltage of the brushless DC motor 120 is obtained as represented by a broken line in FIG. 9, for example. It should be noted that the vertical axis represents a normalized induced voltage obtained by dividing the induced voltage by the motor rotation speed during the measurement. As illustrated in FIG. 9, the normalized induced voltage contains higher harmonic components such as an electrical-angle third-order component in addition to the electrical-angle first-order component (fundamental harmonic).

The induced voltage estimator 60 uses only the induced voltage of the electrical-angle first-order component as information. Specifically, the normalized induced voltage represented by the broken line in FIG. 9 is approximated by the least square method up to the electrical-angle first-order component, and an obtained half amplitude v_norm is used for the calculation for estimation. It should be noted that v_norm is a positive real number.

A description is now given of a method for the shaping into the square waveform by incorporating an induced voltage model of the electrical-angle first-order component into the induced voltage estimator 60. This is summarized as illustrated in FIG. 10. The rotational direction of the motor may be determined by the sign of the electrical angular velocity obtained by calculating the electrical angle detection position θe by the filter 50 included in the current control system 10. Moreover, a half amplitude v_max of the induced voltage is calculated based on the following equation (3).

[Eq. 3]

$$v\_max = v\_norm \times |θe\_dot| \quad (3)$$

As illustrated in FIG. 8, the induced voltage estimator 60 thus calculates the square waveforms by the waveform shaping for each of the detection interval of the electrical angle (the detection interval corresponds to the electrical angle resolution) as the estimated U-phase induced voltage eu_est and the estimated V-phase induced voltage ev_est using the electrical angle detection position θe, the electrical angular velocity θe_dot, and the half amplitude v_norm of the normalized induced voltage obtained by approximating the sinusoidal wave from only the electrical-angle first-order component of the measured value of the induced voltage of the brushless DC motor 120.

A description is now given of the current estimators 70. As illustrated in FIG. 4, the current estimators 70 are to estimate the phase currents flowing respectively in the U phase and the V phase based on a U-phase voltage command vu_com and a V-phase voltage command vv_com obtained as the outputs of the saturation processor 40 and the estimated U-phase induced voltage eu_est and the estimated V-phase induced voltage ev_est obtained as the outputs of the induced voltage estimator 60.

For example, in general current control for individually feeding back the phase currents for the three-phase motor, the gain of the current control system 10 (proportional gain of the current controllers 30) is set to a high level which does not present an oscillation of the current response, namely the response is accelerated by increasing the bandwidth of the current control.

On the other hand, even if a current sensor is not available, namely the current feedback cannot be attained, but if the estimation accuracy of the induced voltage and the accuracy of the modeling of the current estimators 70 are high, and the gain of the current control system 10 (proportional gain of the current controllers 30) is set to a high level which does not present an oscillation of the current response, the actual phase current and the estimated phase current coincide with each other, resulting in an increase in the current response. Then, it is considered that the phase voltage commands coincide with the actual phase voltages of the three-phase motor in this state.

For example, the current estimator 70 is simply modeled as a first-order lag element where R is the winding resistance for one phase, and L is the winding inductance for one phase in order to calculate the estimated U-phase current iu_est and the estimated V-phase current iv_est. Then, the specific calculation by the current estimators 70 is given by the following equations (4) and (5), where ΔTc is the sampling period of the current control system 10. On this occasion, n is the sampling number, which is a positive integer.

[Eq. 4]

$$iu\_est(n) = \frac{\Delta Tc}{L + R \times \Delta Tc} \times (vu\_com(n) - eu\_est(n)) + \frac{L}{L + R \times \Delta Tc} \times iu\_est(n-1) \quad (4)$$

$$iv\_est(n) = \frac{\Delta Tc}{L + R \times \Delta Tc} \times (vv\_com(n) - ev\_est(n)) + \frac{L}{L + R \times \Delta Tc} \times iv\_est(n-1) \quad (5)$$

described above is how the estimated U-phase current iu_est and the estimated V-phase current iv_est are calculated when the current estimators 70 are modeled as the first-order lag elements.

In this way, it is possible to build the virtual current feedback without necessity of a current sensor by forming the configuration of feeding back, to the phase current commands, the estimated currents of the phases calculated based on the equations (4) and (5) using the estimated induced voltages for the U phase and the V phase obtained by the induced voltage estimator 60, the phase voltage commands for the U phase and the V phase, and the current estimators 70 configured by modeling the relationship between the voltage and the current for one phase of the three-phase motor as the first-order lag element during the opening/closing control for the valve 130.

By the way, as the motor angular velocity increases in the opening/closing control for the valve 130, the acquisition of the electrical angle detection position lags due to the influence of the sampling period of the current control system 10, and as a result, the phase current commands, which are the outputs of the current command distributor 20, and the estimated induced voltages, which are the outputs of the induced voltage estimator 60, both of which are calculated in the current control system 10, lag with respect to the responses of the actual phase currents and the actual induced voltages, which may result in a decrease in the response of the valve 130. On this occasion, as described later, the decrease in the response is avoided by adding an amount of the phase lag of the electrical angle detection position due to the influence of the sampling period of the current control system 10 to a new present motor position to be used for control calculation in the current control system 10.

This phase lag amount dθe is calculated by the following equation (6), where ΔTc is the sampling period of the current control system 10, and T_θe is one period of the electrical angle during the motor drive.

[Eq. 5]

$$d\theta e = 360 \times \Delta Tc / (2 \times T\_\theta e) \quad (6)$$

Figure 11:
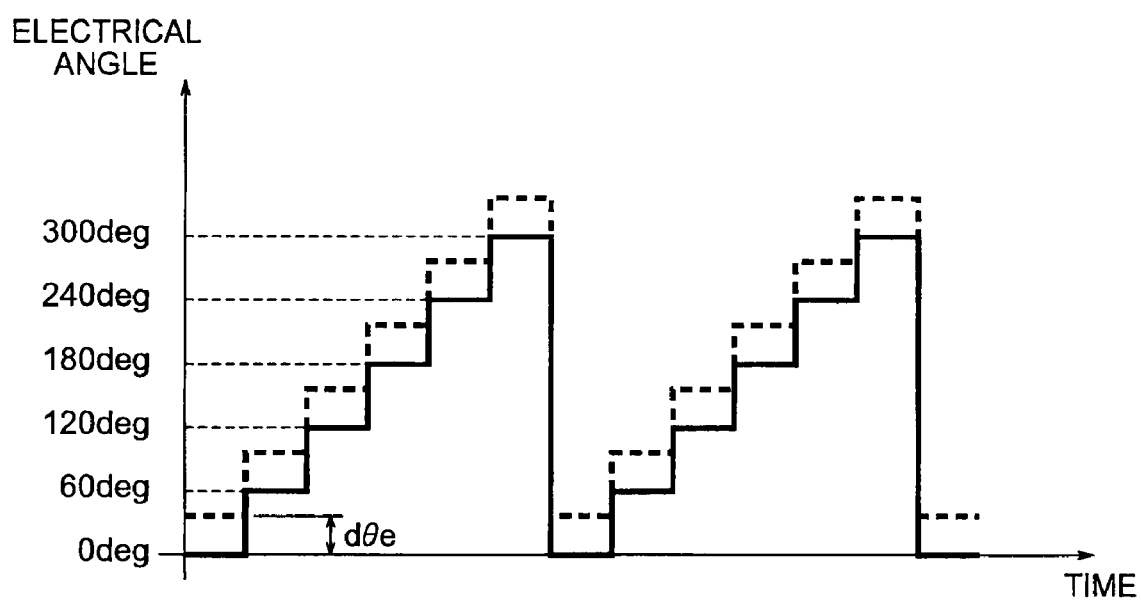
FIG. 11 illustrates a phase correction for a motor electrical angle of the valve control device according to the first embodiment of the present invention.

Then, the phase lag amount dθe set by the phase corrector 90 is added to the phase current commands, which are the outputs of the current command distributor 20, and to the estimated induced voltages, which are the outputs of the induced voltage estimator 60. A new present motor position subjected to the phase correction by the amount of dθe, which is represented by broken lines in FIG. 11, is used for the calculation respectively in the current command distributor 20 and the induced voltage estimator 60, and respective outputs referring to the new present motor position are applied. A fixed value determined based on the maximum angular velocity of the motor is set to the phase lag amount dθe according to the first embodiment, for example. This setting enables suppression of the lag in the calculation of the current command and the lag in the calculation of the induced voltage for each of the phases due to the sampling period of the current control system 10.

According to the first embodiment, the induced voltages and the phase currents of the brushless DC motor 120 which is being driven can be accurately estimated using the position detection sensor 100 having the coarse electrical angle resolution. Moreover, the virtual current feedback is built in the current control system 10 using the estimated values, and a current sensor is thus not required, resulting in a reduction in the cost of the control system.

The basic operation of the valve control device 1 according to the first embodiment has been described. A specific description is now given of an example of the calculation for presenting effects of the valve control device 1.

FIGS. 12A-12B, 13A-13B, and 14A-14B respectively illustrate various time responses when step inputs of the target position command from a full open of 230 steps (1 step corresponds to 60 deg in electrical angle) to a full close of 0 steps corresponding to the mechanical end of the valve 130 are fed.

The valve 130 is configured so that the return torque acts in the valve closing direction, and the inputs from the full open of 230 steps to the full close of 0 steps are thus fed in order to show an effect of effectively generating the motor torque opposite to the return torque for alleviating a change in the motor angular velocity immediately before the full close of the valve 130. Moreover, two cases in which the environmental temperature is 30° C. and 120° C. are assumed in order to show an effect of obtaining the stable valve position response with respect to the environmental temperature. As a friction load, and the winding resistances and winding inductances of the motor, which can change in accordance with the environmental temperature, values corresponding to the environmental temperature are fed. Moreover, though the electrical angle detection position used in the current control system 10 lags due to the influence of the control period as the motor angular velocity increases, the correction amount of the electrical angle phase lag is set to a fixed value of 45 deg in the phase corrector 90 on this occasion, and is taken into account for the respective calculations in the current command distributor 20 and the induced voltage estimator 60.

FIGS. 12A, 13A and 14A and 12B, 13B and 14B respectively represent behaviors for the environmental temperatures of 30° C. and 120° C. Moreover, FIGS. 12A-12B and 13A-13B illustrate various temporal waveforms of the phase induced voltages and the phase currents during an actual operation of the valve illustrated in FIGS. 14A-14B, and the time scales of the horizontal axes in FIGS. 12A-12B to 14A-14B are all the same.

Figure 12A:
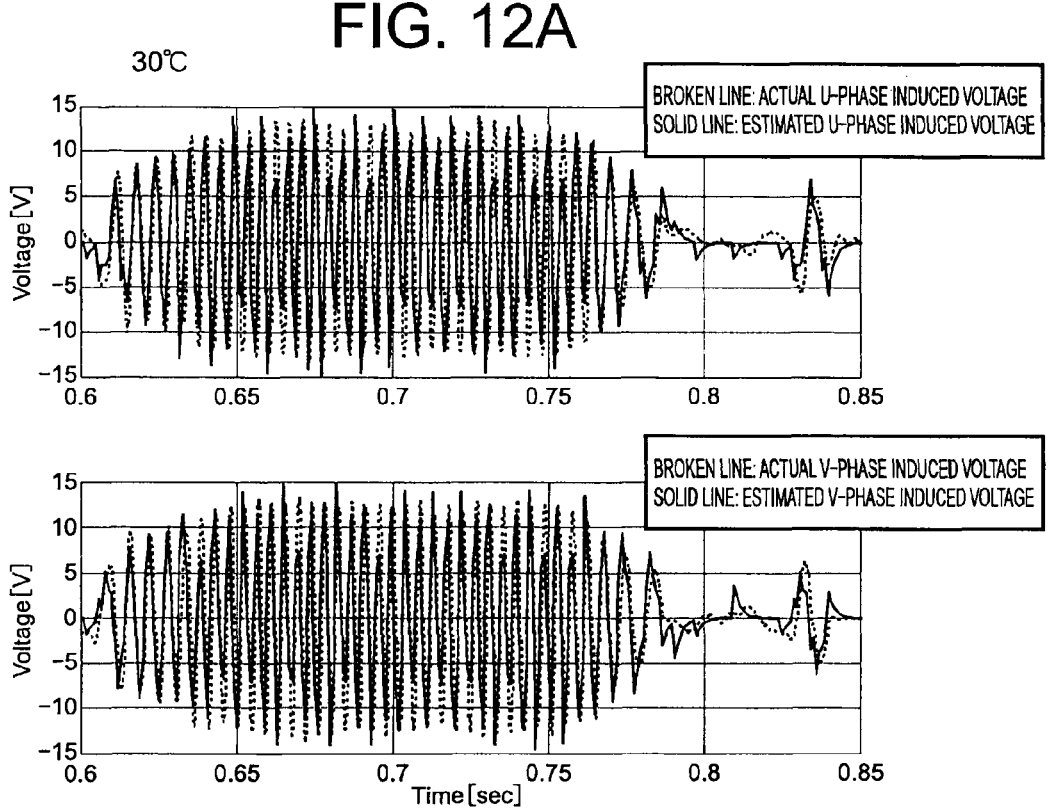
FIGS. 12A-12B illustrate results of simulation for behaviors of estimated induced voltages and actual induced voltages respectively at environmental temperatures of 30° C. and 120° C. during valve closing control of the valve control device according to the first embodiment of the present invention.
Figure 12B:
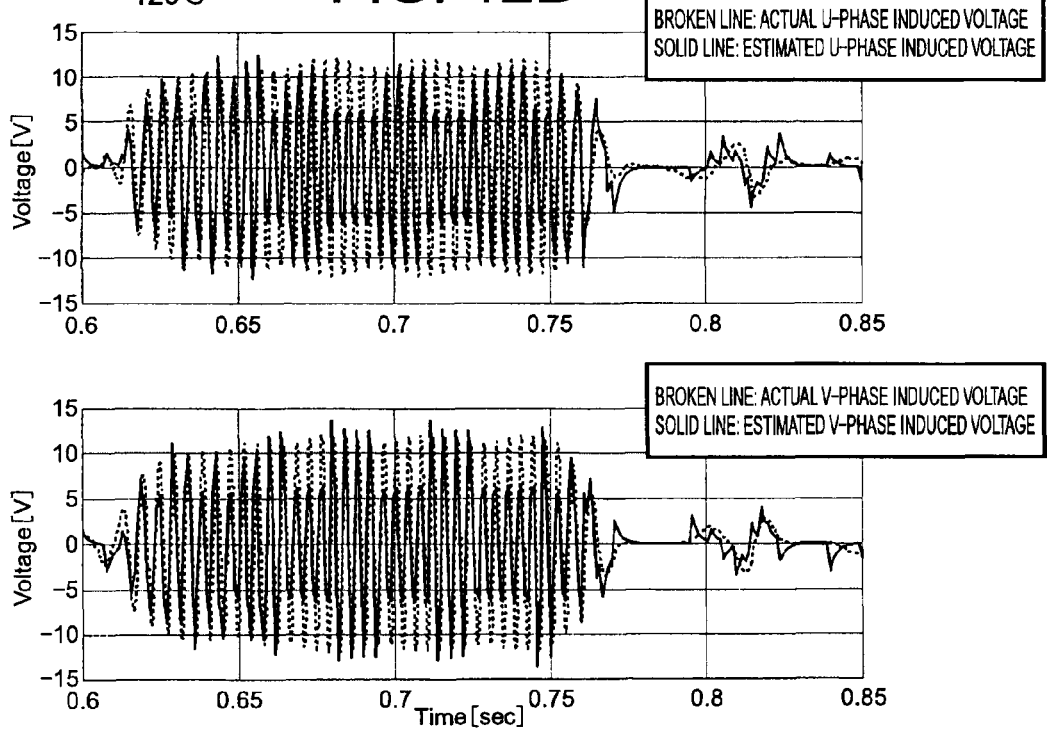

FIGS. 12A-12B illustrate behaviors of the actual induced voltage in broken lines and behaviors of the estimated induced voltage in solid lines for each of the phases. There appear areas in which the actual induced voltage represented by the broken line and the estimated induced voltage represented by the solid line are different in voltage amplitude. These areas are generated because the electrical angle detection position θe acquired in the each sampling period of the current control system 10 cannot change in a regular order, namely by six steps in one period of the electrical angle as the valve closing velocity of the valve 130 increases. However, this phenomenon can be suppressed by decreasing the sampling period of the current control system 10, for example.

FIGS. 13A-13B illustrates behaviors of the actual phase current in broken lines for each of the phases, and behaviors of the estimated current in solid lines for each of the phases. Though there is influence of the estimation accuracy of the estimated induced voltage described above, the actual phase current and the estimated phase current well coincide with each other, and as illustrated in FIG. 4, this result clearly indicates that the virtual current feedback can be realized even with the simple first-order lag elements modeling the electrical characteristics of the motor by the serial connection of the winding resistance component and the winding inductance component for one phase.

Figure 14A:
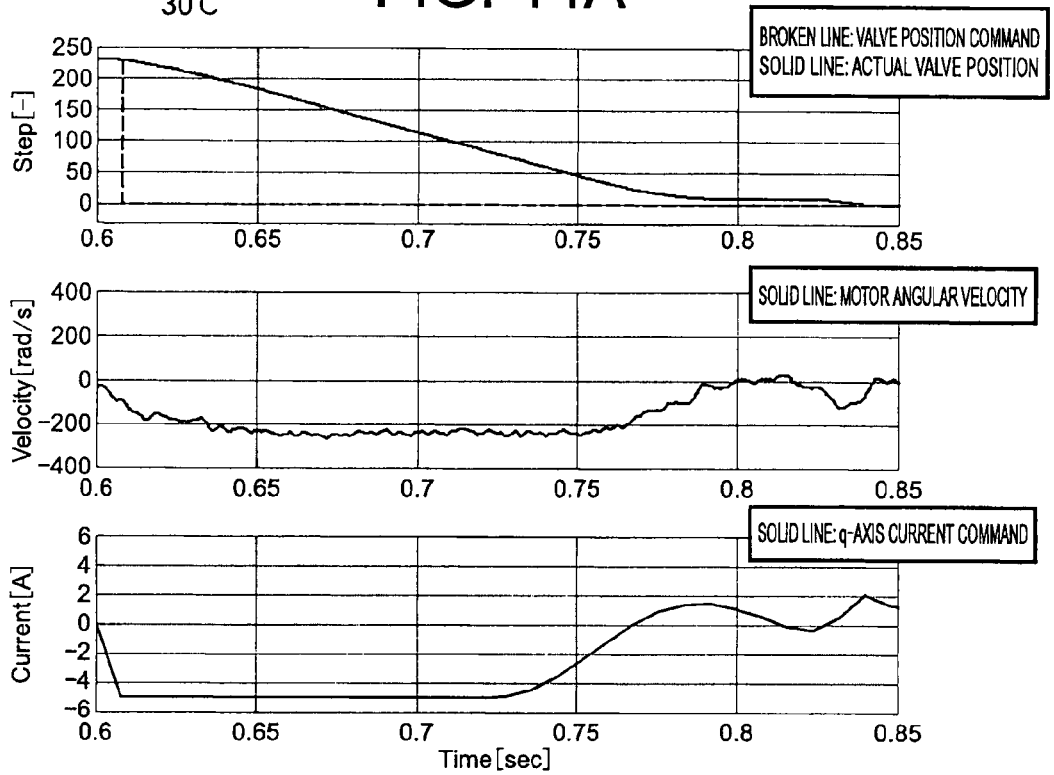
FIGS. 14A-14B illustrate results of simulation for behaviors of a valve position command, an actual valve position, a motor angular velocity, and a q-axis current command respectively at the environmental temperatures of 30° C. and 120° C. during the valve closing control of the valve control device according to the first embodiment of the present invention.
Figure 14B:
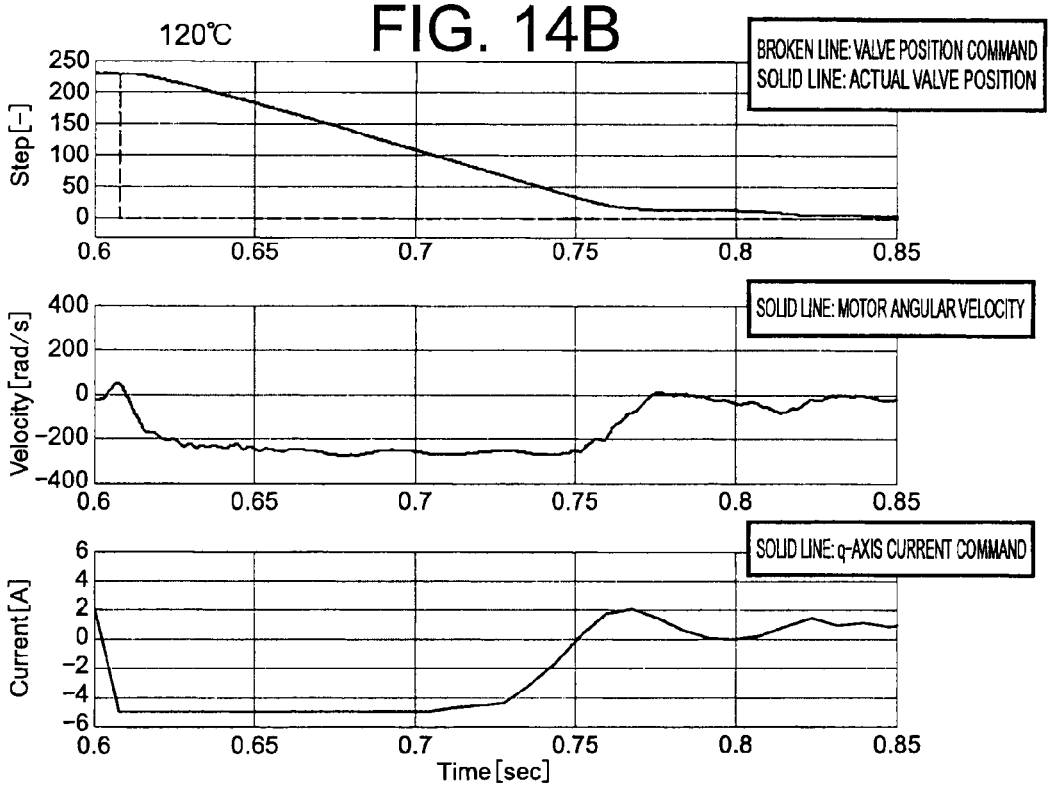

FIGS. 14A and 14B respectively illustrate various time responses at the environmental temperatures 30° C. and 120° C. In the charts of FIG. 14A, for example, a first row illustrates the valve position command and the actual valve position respectively in broken and solid lines, a second row illustrates the motor angular velocity in a solid line, and a third row illustrates the q-axis current command in a solid line. FIG. 14B illustrates the same items as FIG. 14A. Both at the environmental temperatures 30° C. and 120° C., the q-axis current command is effectively generated in the direction opposite to the acting direction of the return torque in a low rotation speed area before the full close, and the actual valve position indicates a soft landing without collision with the mechanical end (0 steps).

Moreover, though mechanical characteristics of the valve 130 such as the friction load and electrical characteristics of the motor 120 such as the winding resistance can change in accordance with the environmental temperature, the response times from the full open of 230 steps to a 10% opening (23 steps) are 162 ms and 151 ms respectively at the environmental temperatures of 30° C. and 120° C., and a difference in the response time is thus as small as 11 ms even for the change in the environmental temperature, resulting in a stable valve behavior having a small variation in the response time.

As described above, according to the first embodiment, in the a valve control device 1, in which the actuator is the brushless DC motor 120, and the position detection sensor 100 of a pulse output type is provided to the brushless DC motor 120, the valve control device 1 includes the current control system 10 which calculates phase current commands and induced voltages based on a sensor output having a coarse electrical angle resolution and further suppresses influence of the sampling period by carrying out a phase correction for a position to be used for current control, to provide a virtual current feedback which allows phase currents to be accurately estimated. The current control system 10 directly controls the motor torque, and hence a current corresponding to the torque contributing to the torque is effectively generated to increases the response speed of the valve 130, and enable a soft landing without collision of the valve 130 with the mechanical end.

[Second Embodiment]

Figure 15:
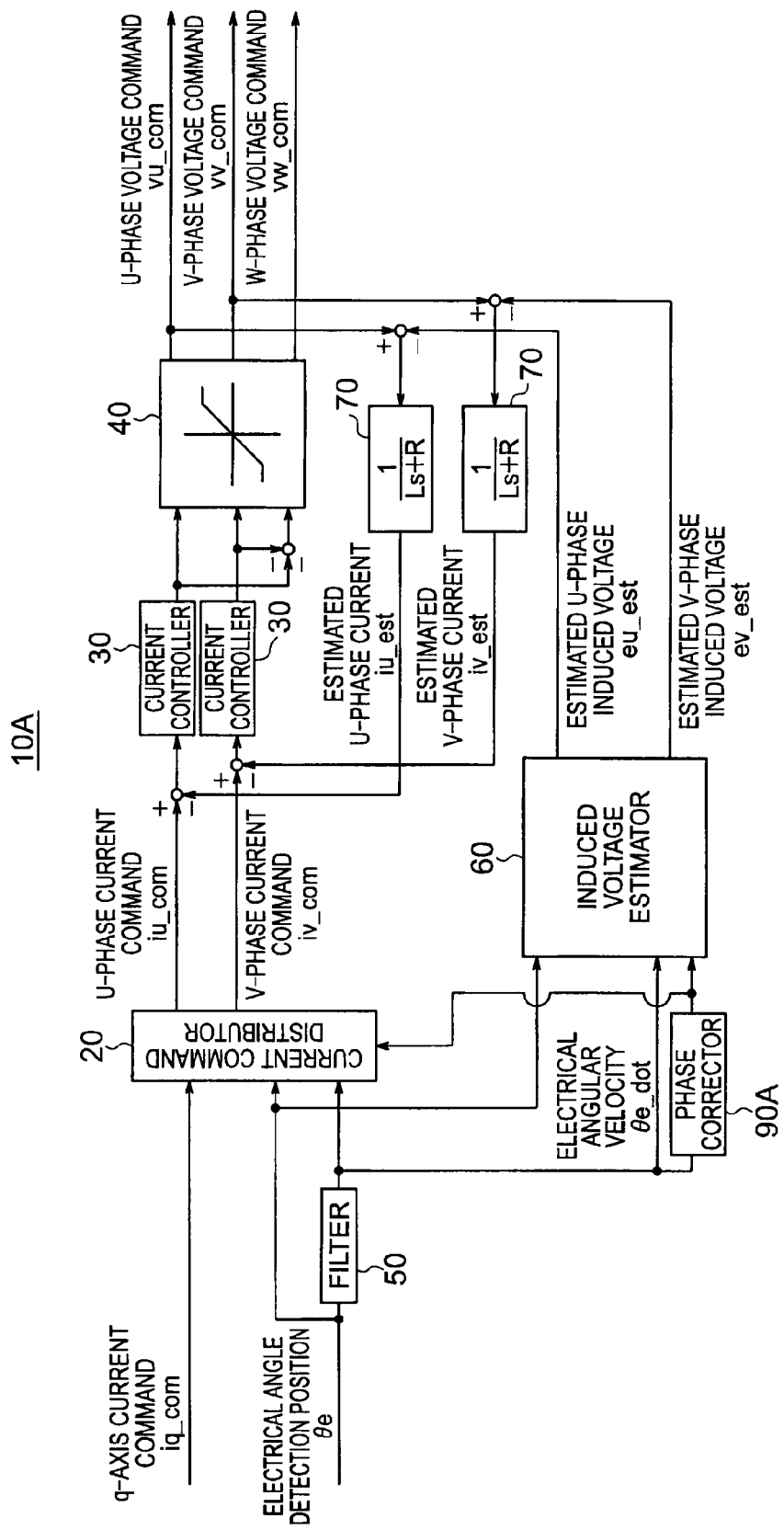
FIG. 15 is a block diagram illustrating a configuration of a current control system of a valve control device according to a second embodiment of the present invention.

A description is now given of a valve control device according to a second embodiment of the present invention referring to FIG. 15. FIG. 15 is a block diagram illustrating a configuration of a current control system of the valve control device according to the second embodiment of the present invention.

In FIG. 15 A, a current control system 10A of the valve control device 1 according to the second embodiment of the present invention includes a phase corrector 90A for providing an optimal phase correction amount in accordance with the motor angular velocity. The current control system 10A is different from the current control system 10 of the valve control device 1 according to the first embodiment, in which the base corrector 90 sets the phase lag amount dθe as the fixed value determined by the maximum motor angular velocity. Thus, while the phase correction amount (equal to dθe) is constant according to the first embodiment, the phase correction amount changes in accordance with the motor angular velocity according to the second embodiment.

The valve control device 1 according to the second embodiment has the following object. In the current control system 10 described in the first embodiment, the phase lag in the acquisition of the electrical angle detection position due to the influence of the sampling period of the current control system 10A when the motor angular velocity increases in the opening/closing control for the valve 130 is automatically adjusted by providing the phase corrector 90A for providing an optimal phase correction amount based on the motor angular velocity, thereby increasing the response of the valve, especially characteristics upon the motor start and the motor stop.

In FIG. 15, the phase correction is carried out by the phase corrector 90A in place of the phase corrector 90 according to the first embodiment. The phase corrector 90A corrects the phase corresponding to the phase lag in the acquisition of the electrical angle detection position due to the influence of the sampling period of the current control system 10A as described above.

The specific phase correction amount dθe is calculated by the following equation (7), where ΔTc is the sampling period of the current control system 10A. Then, the current command distributor 20 calculates the phase current command for each of the phases and the induced voltage estimator 60 calculates the estimated induced voltage for each of the phases referring to the new present motor position to which the phase correction amount dθe is added.

[Eq. 6]

$$d\theta e = 360 \times \Delta Tc/2 \times \theta e\_dot/(2 \times \pi) \qquad (7)$$

This equation (7) is a function of the electrical angular velocity θe_dot, and the optimal phase correction amount is thus automatically adjusted for the arbitrary motor angular velocity. As a result, adjustment is made so that the phase lags of the phase current commands and the estimated induced voltages calculated by the current control system 10A are small respectively with respect to the phases of the actual phase currents and the actual induced voltages, thereby increasing the response of the valve 130.

[Third Embodiment]

Figure 16:
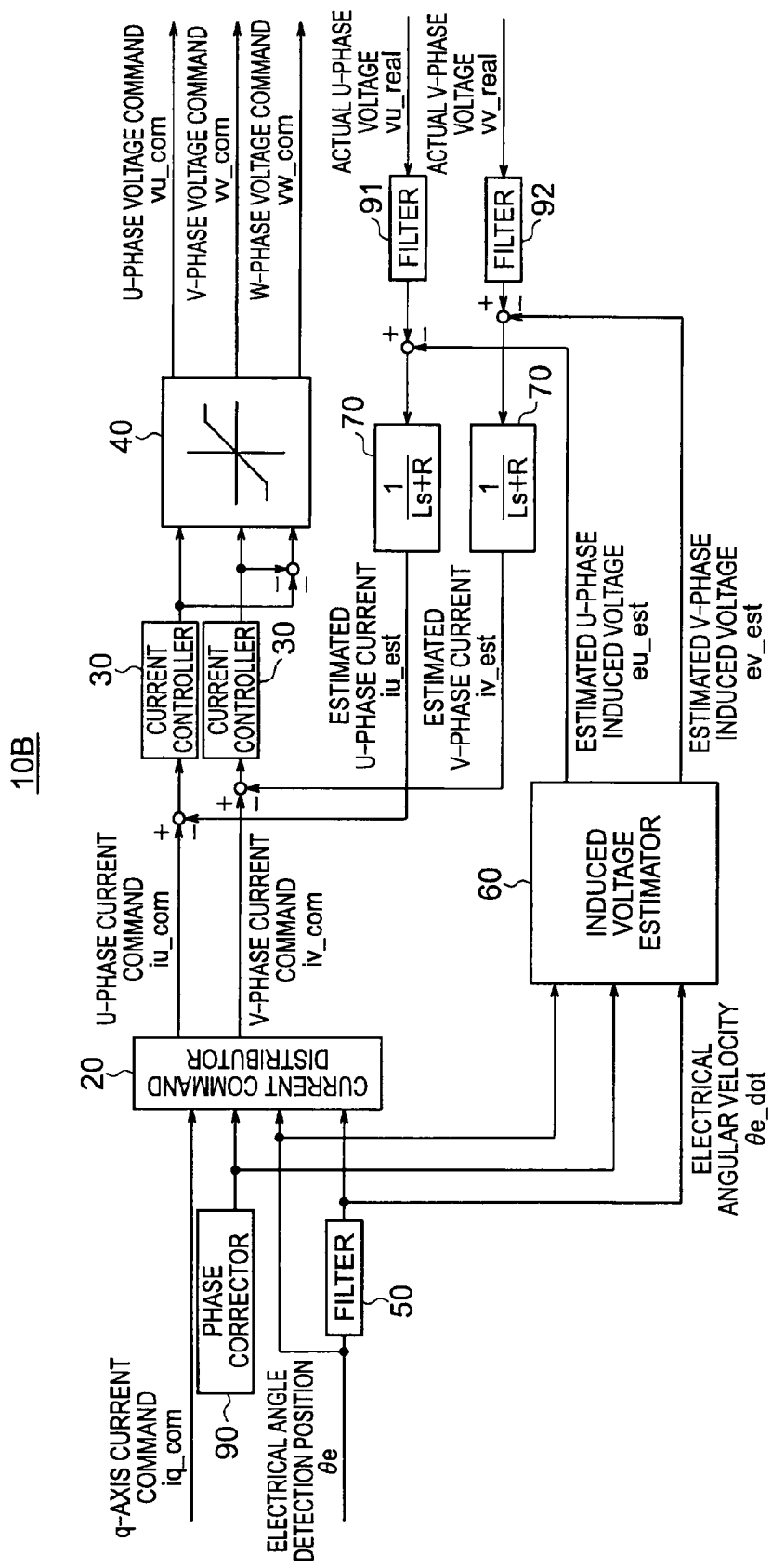
FIG. 16 is a block diagram illustrating a configuration of a current control system of a valve control device according to a third embodiment of the present invention.

A description is now given of a valve control device according to a third embodiment of the present invention referring to FIG. 16. FIG. 16 is a block diagram illustrating a configuration of a current control system of the valve control device according to the third embodiment of the present invention.

The valve control device 1 according to the third embodiment of the present invention has the following configuration. In the current control system 10 of the valve control device 1 according to the above-mentioned first embodiment, the estimated current for each of the phases is calculated using the actual phase voltage in place of the phase voltage command.

When the actual phase voltage is used, an actual U-phase voltage and an actual V-phase voltage are respectively smoothed by filters 91 and 92 in order to attenuate noise in synchronism with a PWM carrier frequency, thereby using the Actual U-phase voltage and the Actual V-phase voltage for the current estimation. It should be noted that phase correction calculation may be added to the filters 91 and 92 for correcting the phase lag due to the sampling period of a current control system 10B. This configuration can provide an effect similar to those of the first and second embodiments.

For the winding inductance L and the winding resistance R of the current estimators 70 described in the first to third embodiments, for example, arithmetic means of a value at the upper limit of the environmental temperature and a value at the lower limit of the environmental temperature may be used as fixed values. Alternatively, if an upper controller (not shown) located upstream of the valve control device 1 provides temperature information, the values may be updated using maps for the temperature and the winding resistance and for the temperature and the winding inductance, which have been measured in advance.

Further, in the first to third embodiments, the q-axis current command which is an output of the position control system 80 may be corrected by referring to a motor power supply voltage in order to address a variation in the motor power supply voltage during the valve drive.

Moreover, even if the electrical angle resolution of the position detection sensor 100, which is provided to the brushless DC motor 120 for driving the valve mechanism, is 30 deg, the calculations for the approximation of the phase current command and the estimated induced voltage by square waves are carried out by the same method described in the first embodiment.

REFERENCE SIGNS LIST

1 valve control device; 10, 10A, 10B current control system; 20 current command distributor; 30 current controller; 40 saturation processor; 50 filter; 60 induced voltage estimator; 70 current estimator; 80 position control system; 87 saturation processor; 90, 90A phase corrector; 91, 92 filter; 95 detection position converter; 100 position detection sensor; 110 drive circuit; 120 brushless DC motor; 130 valve.

The invention claimed is:

1. A valve control device for a valve mechanism to which a return torque is applied in an opening direction or a closing direction of a valve, the valve control device controlling opening and closing of the valve in a balance between the return torque and a motor torque provided by control of a motor for applying a torque in a direction opposite to a direction of the return torque, the valve control device comprising:
 a detection position converter for converting an electrical angle detection position, which is a present position of the motor detected by a position detection sensor of a pulse output type and changes stepwise, into a mechanical angle detection position;
 a position control system for outputting a q-axis current command based on a deviation between a target position command and the mechanical angle detection position of the motor; and
 a current control system constituting a current feedback system for distributing the q-axis current command to a phase current command of each of phases of the motor based on the electrical angle detection position which changes stepwise, generating a phase voltage command of the each of the phases based on a current deviation between the phase current command and a fed-back estimated current of the each of the phases, obtaining an estimated induced voltage of the each of the phases based on the electrical angle detection position which changes stepwise and an induced voltage actually measured in advance, and obtaining an estimated current of the each of the phases based on the estimated induced voltage and the phase voltage command, and outputting a phase voltage command to which saturation processing is finally applied in an actually-used voltage range.

2. The valve control device according to claim 1, wherein the current control system comprises:
 a phase corrector for outputting a phase correction amount, which is used for correction of an amount corresponding to a phase lag of the electrical angle detection position due to influence of a sampling period of the current control system;
 a current command distributor for distributing the q-axis current command into the phase current command of the each of the phases of the motor based on the phase correction amount and the electrical angle detection position;
 a current controller for generating the phase voltage command based on the current deviation obtained by a difference operation between the phase current command and the fed-back estimated current of the each of the phases;
 a saturation processor for applying the saturation processing to the phase voltage command in the actually-used voltage range to output the phase voltage command;
 a filter for smoothing the electrical angle detection position to obtain an electrical angular velocity, which is a present velocity of the motor;
 an induced voltage estimator for obtaining the estimated induced voltage of the each of the phases based on the phase correction amount, the electrical angle detection position, the electrical angular velocity, and the induced voltage actually measured in advance; and
 a current estimator configured by modeling a relationship between a voltage and a current for one phase of a three-phase motor as a first-order lag element for obtaining the estimated current based on a voltage deviation obtained by a difference operation between the estimated induced voltage, which is an output of the induced voltage estimator, and the phase voltage command, which is an output of the saturation processor.

3. The valve control device according to claim 2, wherein the current command distributor generates the phase current command of the each of the phases of a square wave obtained by waveform shaping for each of detection intervals of an electrical angle detection position, which is a new present position of the motor obtained by a correction calculation based on the phase correction amount obtained from the phase corrector, based on the electrical angle detection position and the q-axis current command.

4. The valve control device according to claim 2, wherein the induced voltage estimator generates the estimated induced voltage of the each of the phases of a square wave obtained by waveform shaping for each of detection intervals of an electrical angle detection position, which is a new present position of the motor obtained by a correction calculation based on the phase correction amount obtained from the phase corrector, based on the electrical angle detection position, the electrical angular velocity, and the induced voltage actually measured in advance.

5. The valve control device according to claim 1, wherein the position detection sensor has an electrical angle resolution of from 30 deg to 60 deg.

* * * * *